Sept. 27, 1966  F. W. WITZKE  3,274,693
METHOD AND APPARATUS FOR ROUNDNESS MEASUREMENT
Filed Feb. 4, 1965  4 Sheets-Sheet 1
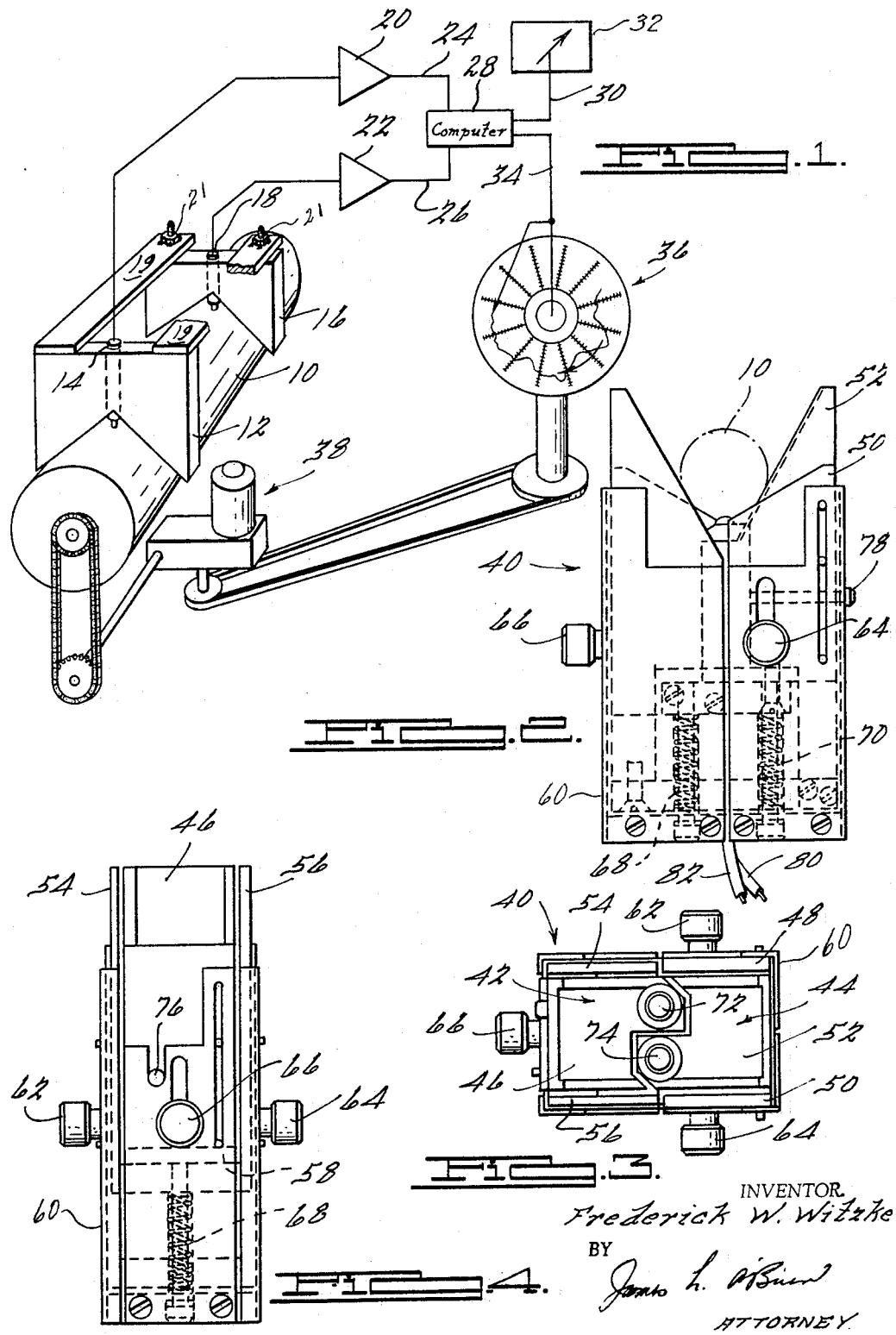
INVENTOR.
Frederick W. Witzke
BY
ATTORNEY Sept. 27, 1966     F. W. WITZKE     3,274,693
METHOD AND APPARATUS FOR ROUNDNESS MEASUREMENT
Filed Feb. 4, 1965     4 Sheets-Sheet 2

| Number Of Lobes | Actual Profile Of Object | 60° V Angle | 120° V Angle | Arithmetic Combination Of Columns (c) and (d) | Combination Of Columns (c) and (d) Factored |
|---|---|---|---|---|---|
| (a) | (b) | (c) | (d) | (e) | (f) |
| 3 | | C=3 | C=1 | C=4 | C=1 |
| 5 | | C=0 | C=2 | C=2 | C=1 |
| 7 | | C=0 | C=2 | C=2 | C=1 |
| 9 | | C=3 | C=1 | C=4 | C=1 |

FIG. 5.

INVENTOR.
Frederick W. Witzke
BY
James L. Osborn
ATTORNEY

Sept. 27, 1966  F. W. WITZKE  3,274,693
METHOD AND APPARATUS FOR ROUNDNESS MEASUREMENT
Filed Feb. 4, 1965  4 Sheets-Sheet 4
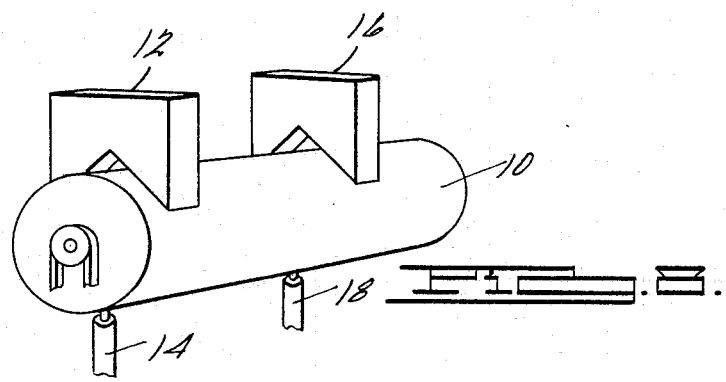
FIG. 8.
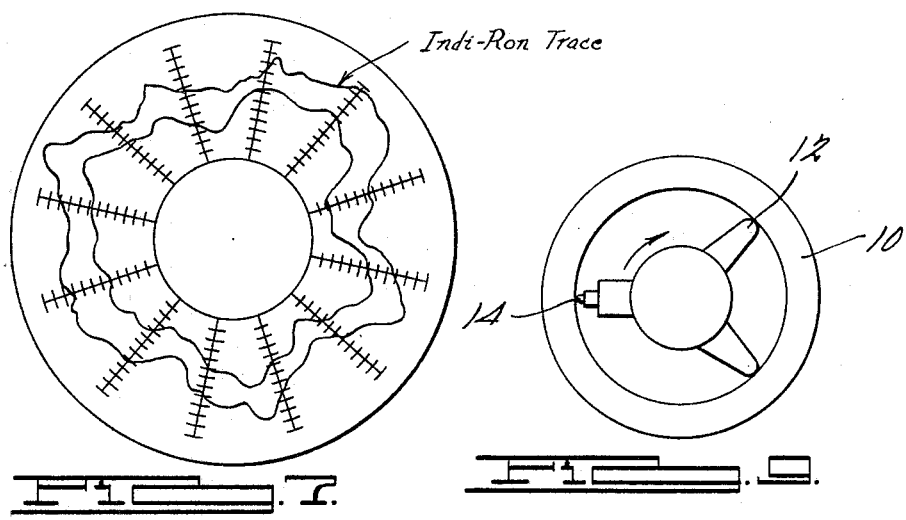
FIG. 7.
FIG. 9.
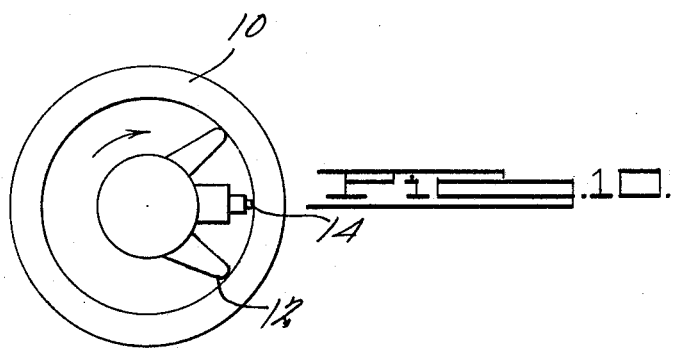
FIG. 10.
INVENTOR.
Frederick W. Witzke
BY
James L. Osburn
ATTORNEY.

United States Patent Office 3,274,693
Patented Sept. 27, 1966

1

3,274,693
METHOD AND APPARATUS FOR ROUNDNESS MEASUREMENT
Frederick W. Witzke, Cleveland, Ohio, assignor to The Bendix Corporation, Ann Arbor, Mich., a corporation of Delaware
Filed Feb. 4, 1965, Ser. No. 430,371
6 Claims. (Cl. 33—174)

The present invention relates to a method and apparatus for measuring the radial deviation of out-of-roundness of objects having nominally circular cross sections.

One known method used to measure certain types of out-of-roundness involves the rotation of an object in a V-block and the measurement of the surface excursions of the object with respect to the block with a dial indicator gage. This known method is limited to situations where a single lobing condition is present and the number of lobes predetermined. An appropriate V-block angle may then be selected for the particular lobing condition and a lobing coefficient calculated which when applied to the dial indicator reading will give the radial deviation of the surface of the object. Complex lobing conditions, however, cannot be satisfactorily measured with this known method nor indeed can simple lobing conditions be measured unless the type of condition can be predetermined. A given V-block and indicator gage combination will be insensitive to some simple lobing conditions and with others will supply indicator readings which vary from the true radial deviation by some factor which is a function of the V-block angle and the number of lobes on the part to be measured.

Another known and more comprehensive method of measuring the out-of-roundness of an object is to rotate the object about a precision axis and directly measure the radial deviation of the object with an electronic displacement gage. Such a method and the apparatus for carrying it out is disclosed in United States Patent No. 3,125,811 which is assigned to the assignee of the present invention. This latter method using a precision axis and direct radial measurement is satisfactory for measuring radial deviation of objects having a nominally circular cross section; but is relatively expensive and delicate. There is also a limitation on the size and weight of the objects which may be measured with such a method; and it is impossible to measure the objects in situ or while mounted on a machine tool.

I have discovered that by measuring the displacement of the periphery of an object with respect to two or more V-blocks or equivalent supporting devices and combining said measurements as hereinafter described that I am able to determine with a high degree of accuracy the radial deviation of an object even though the object may have complex lobing condition. The readings obtained by the use of the present invention compare very favorably with those obtained from the much more expensive precision axis electronic gage combination.

It is an object of the present invention to provide a new and improved method and apparatus to measure the radial deviation of an object with a high degree of accuracy.

Another object of the present invention is to provide a roundness gage which is relatively inexpensive to manufacture, rugged in construction, reliable in operation and which has a high degree of stability and low maintenance requirements.

It is a further object of the present invention to provide a method and apparatus for measuring the radial deviation of objects in situ.

It is another object of the present invention to provide a method and apparatus for measuring the radial deviation of objects whose lobing or out-of-roundness characteristics are unknown prior to measurement.

It is still a further object of the present invention to provide a method and apparatus for measuring the radial deviation of objects in which the measurement may be simply indicated and accurately recorded.

These and other objects and advantages of the present invention will become readily apparent from the following detailed description taken in connection with the appended drawings wherein:

FIGURE 1 is a schematic view of a roundness gage embodying the present invention;

FIGURE 2 is an elevation view of a combination V-block device which may be used for the V-blocks shown in FIGURE 1;

FIGURE 3 is a top view of device shown in FIGURE 2;

FIGURE 4 is a side view of the device shown in FIGURE 3;

FIGURE 5 is a chart illustrating actual and measured profiles of several objects embodying different lobed conditions;

FIGURE 7 is a polar chart showing the profile of a certain object measured respectively in accordance with the present invention and with an Indi-Ron precision axis type of roundness gage;

FIGURE 8 illustrates a modification of the device of FIGURE 1 wherein the gage probes are disposed oppositely the V-angle devices; and FIGURES 9 and 10 represent two forms of V-angle devices and probes which are particularly suitable for internal measurements.

Figure 6:
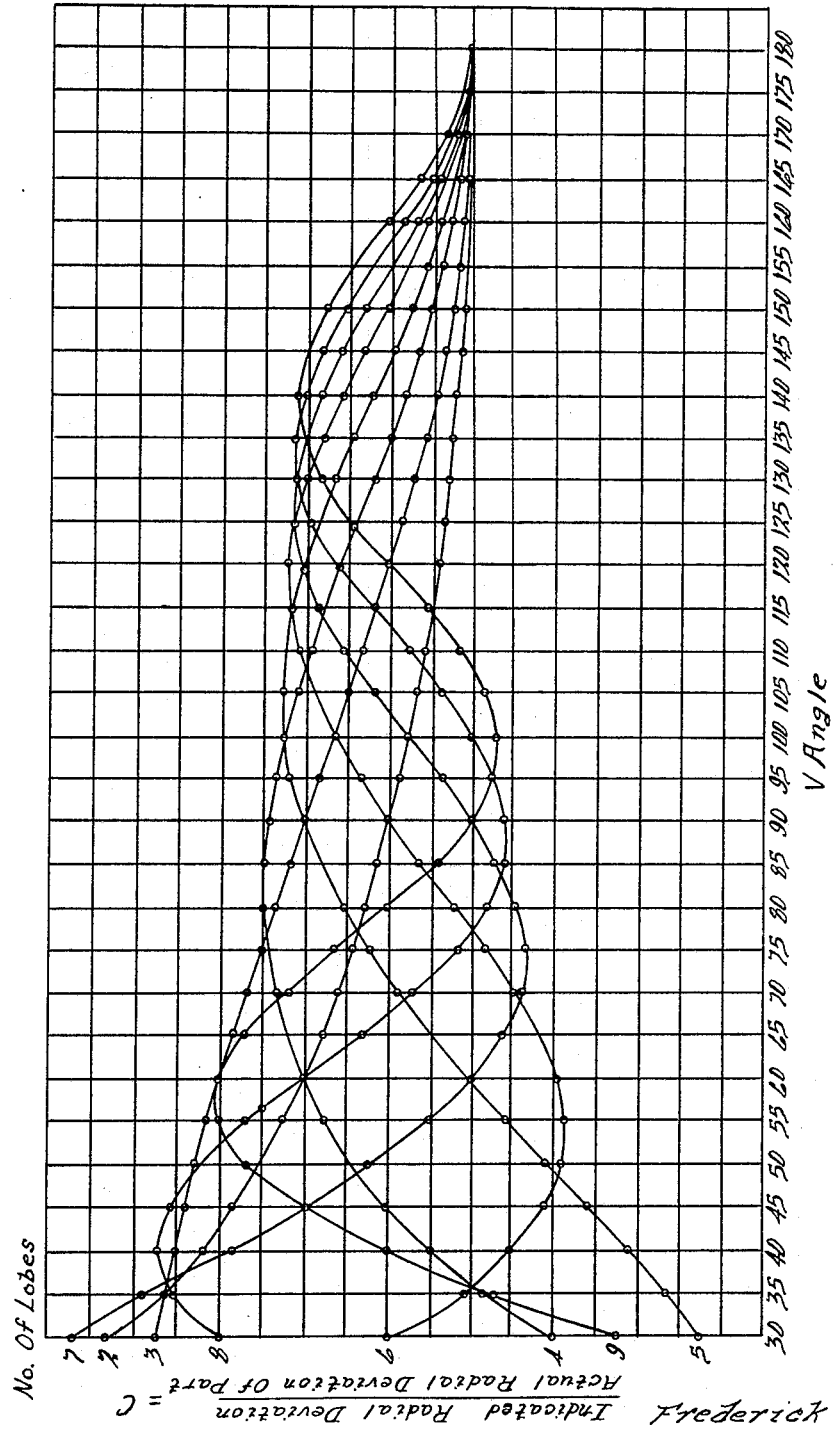
FIGURE 6 is a graph showing the ratio of indicated radial deviation to actual radial deviation for various lobed conditions and V-block angles.

Referring now to the drawings and more particularly to FIGURE 1, numeral 10 designates an object, the profile of which is to be measured, 12 a first V-angle device and 14 its associated transducer or gage probe, 16 a second V-angle device and 18 its associated transducer or gage probe. The V-angle devices 12 and 16 are connected by suitable means such as straps 19 and V-angle device 16 is secured to straps 19 by adjustable means or bolts 21. Devices 12 and 16 are held in contact with the object 10 by hand or other suitable means (not shown). The transducers or gage probes 14 and 18 may be of any suitable type, but particularly useful are transducers of the type shown in U.S. Patent Nos. 2,545,881 and 2,844,879, assigned to the assignee of the present invention which produce an electrical signal output the amplitude of which is a function of the displacement of the probe tip. Transducers 14 and 18 are respectively connected to amplifiers 20 and 22 which in turn are connected respectively by leads 24 and 26 to computer 28 which is suitably programmed to provide an output indicative of the actual radial deviation of the periphery of the object measured. The output from computer 28 may be connected by conductor 30 to a meter or other suitable visual indicating means 32 and may also be connected by a conductor 34 to polar chart recording device 36 which is driven in synchronism with the object 10 by driving means designated generally at 38. Although a polar recorder has been shown, it is to be understood that a strip type or other suitable recorder may be used in place of polar recorder 36.

The number of V-angle devices 12 and 16 may be varied as desired as long as at least two such devices are present. A particularly useful V-angle device combination is shown in FIGURES 2, 3 and 4 wherein the combination 40 includes a first three pronged V-angle device 42 and a second three pronged V-angle device 44 reciprocably mounted with respect to device 42. As best seen in FIGURE 3, the three prongs of device 42 are respectively designated 46, 48 and 50 and the three prongs of device 44 are respectively designated 52, 54 and 56. The three prongs of each device 42 and 44 are connected by a bottom plate, only the one connecting the bottom of prongs 52, 54 and 56 is shown and is designated by numeral 58 in FIGURE 4.

The devices 42 and 44 are mounted in a housing 60 with the device 42 being adjustably positioned therein by means of adjusting screws 62, 64 and 66 and the device 44 being reciprocably disposed therein with springs 68 and 70 urging it toward one of its extreme positions. Transducers 72 and 74 are respectively mounted in V-angle devices 42 and 44. The transducers are mounted in fixed angular relation to the V-angle devices but are adjustable axially, the adjusting screw for transducer 72 being shown at 76 in FIGURE 4 and the adjusting screw for transducer 74 being shown at 78 in FIGURE 2. Transducers 72 and 74 are respectively connected to leads 80 and 82 which are adapted to be connected to amplifiers such as are shown in FIGURE 1 at 20 and 22. The part to be measured 10 may be rotated or the combination 40 itself may be rotated either by hand or with a suitable fixture and driving means.

Referring now to FIGURE 5, columns (c), (d) and (e) illustrate the profiles obtained from measurements taken with single V-angle devices and the arithmetic combination of such measurements which may be compared with the actual profiles of the objects in column (b). In the case of the three and nine lobed objects, the measurements taken with the single 120 degree V-angle device reproduce the correct profile as shown by comparing columns (b) and (d). However, in all of the other cases shown, the measurements either fail to reveal an out-of-roundness condition or produce wildly distorted profiles. As will be more fully explained below, the measurements taken from appropriate V-angle devices such as illustrated in columns (c) and (d) may be combined in accordance with the present invention, as shown in column (f), to substantially reproduce the actual profiles of the objects. The lobing coefficient C is set forth in connection with each of the measured profiles illustrated in FIGURE 5. C, the lobing coefficient, is the ratio of the indicated radial deviation of the periphery of the object to the actual radial deviation. When the transducer or gage probe for obtaining the indicated radial deviation is located at the bottom of the constraining V-angle device, the equation for the lobing coefficient is as follows:

$$C = \csc A \left[ -\sin \frac{N}{2} \left( 180 - 2A + \frac{180}{N} \right) \right] + 1$$

where:

$A$ = one-half the V-angle
$N$ = number of lobes on the object to be measured

When the transducer is opposite the bottom of the constraining V-angle device, the equation for the lobing coefficient becomes:

$$C = [1 - \cos N(180)] - [\cos N] \times$$

$$\left\{ \csc A \left[ -\sin \frac{N}{2} \left( 180 - 2A + \frac{180}{N} \right) \right] + 1 \right\}$$

In FIGURE 6, the lobing coefficients for different numbers of lobes and for a range of V-angles are shown for the situation where the transducer is located at the bottom of the V-angle device. I have discovered that it is possible to select various angles for two or more V-angle devices and to combine the measurements taken with respect to said devices in the following equation to obtain the actual radial deviation of the object within a satisfactory degree of accuracy to be useful as a method of measuring within the accepted standards of industry:

$$R_D = K_1 \Delta i_a + K_2 \Delta i \ldots + K_m \Delta i_m$$

where:

$R_D$ = actual radial deviation of the part to be measured
$\Delta i_a \ldots \Delta i_m$ = change in measured or indicated radial deviation of the object with respect to a particular V-angle device ($a$ to $m$)
$K_1 \ldots K_m$ = empirical factors to respectively weight the values of indicated radial deviation $i_a$ to $i_m$ The factors $K_1 \ldots K_m$ are selected such that a minimum variance in the sum of the products $K_1 \Delta i_a \ldots K_m \Delta i_m$ is obtained over the range of lobed conditions of interest. Analyses of computer programs in which the number of lobes and the V-angles were varied, revealed pluralities of satisfactory V-angle and K factor combinations. In the computer programs run thus far the number of lobes has been varied from 2 to 200 and the V-angles from 30 degrees to 150 degrees. As an example of one satisfactory combination, with a V-angle of 60 degrees for device $a$ and a V-angle of 120 degrees for device $b$ the factors $K_1 = 0.1449$ and $K_2 = 0.5000$ introduced in the above equation will provide acceptable values of $R_D$ for objects having three to nine lobes.

FIGURE 7 is a reproduction of a polar chart comparing the measurements of the profile of a certain object made respectively by a device of the present invention and an Indi-Ron precision axis roundness measurement gage.

The V-angle devices may assume a variety of shapes and may be of fixed angle or variable angle type and the term V-angle device includes contacting or supporting structure which contacts the part to be measured at substantially the same points as the V-block having the equivalent angle. The transducers may be disposed at the vertex of the V's such as shown in FIGURE 1 or may be disposed oppositely such as shown in FIGURE 8. The V-angle devices may also be constructed as shown in FIGURES 9 and 10 to facilitate the measurement of internal surfaces. The transducers, amplifiers and computer may be electrical, mechanical or pneumatic. Either the object to be measured or the V-angle devices may be rotated.

Although the invention has been described with reference to a particular embodiment with various modifications thereon it will be readily apparent to one skilled in the art that various changes may be made without departing from the spirit of the invention.

I claim:

1. A roundness gage for measuring the radial deviation of objects comprising:
    a first three pronged V-angle device having a predetermined included angle,
    a second three pronged V-angle device having a predetermined included angle different than the included angle of said first device, reciprocably mounted relative to said first device,
    first and second displacement transducers respectively mounted in fixed angular relation to said first and second devices adapted to measure the radial displacement of the periphery of said objects relative to said devices, and
    means connected to said transducers for factoring the outputs therefrom and combining said outputs to provide a single output indicative of the actual radial deviation of said objects.

2. A roundness gage for measuring the radial deviation of objects comprising:
    a first V-angle device,
    a second V-angle device mounted adjacent to said first device, said devices having different included angles,
    first and second transducers respectively mounted in fixed angular relation to said devices and adapted to provide an output signal indicative of the radial displacement of the periphery of said object relative to said devices, and means connected to said transducers for combining and factoring said outputs to form a single factored output indicative of the actual radial deviation of said objects.

3. A roundness gage for measuring the radial deviation of objects comprising: a first reference device adapted to contact said object at two circumferentially spaced points, a second reference device adapted to contact said object at two circumferentially spaced points, the spacing between said last mentioned points being unequal to the spacing between said first mentioned points, first and second transducers respectively mounted in predetermined relation to said reference devices to provide an output signal indicative of the surface deviation of the periphery of said object with respect to said devices and means connected to said transducers for combining said signals to form an output signal indicative of the surface deviation of the object in accordance with the following formula:

$$D = K_1 \Delta i_a + K_2 \Delta i_b$$

where:

$D$ = surface deviation of the object to be measured
$\Delta i_a$ and $\Delta i_b$ = respective change in measured surface deviation of the object with respect to reference devices $a$ and $b$.
$K_1$ and $K_2$ = empirical factors to weight the values of indicated surface deviation.

4. A device for measuring the radial displacement of an object having a nominally circular cross section comprising: two or more V-angle devices for straddling said object at points spaced along the length of said object each of said devices having a different predetermined included angle, means for rotating the object with respect to the devices or vice versa, transducer means associated with each of said devices for generating signals respectively indicating the radial displacement of the object with respect to each of said devices, means connected to said transducer means for combining said signals to produce an output signal indicative of the radial displacement of the object in accordance with the following formula:

$$R_D = K_1 \Delta i_a + K_2 \Delta i_b \ldots + K_m \Delta i_m$$

where:

$R_D$ = radial displacement of the object to be measured
$\Delta i_a \ldots \Delta i_m$ = change in measured radial displacement of of the object with respect to a particular V-angle device ($a$ to $m$)
$K_1 \ldots K_m$ = empirical factor to respectively weight the values of indicated radial displacement $i_a$ to $i_m$.

5. A device for measuring the radial deviation of an object comprising: two or more V-angle devices for engaging said object, each of said devices having a different predetermined included angle, means for rotating the object with respect to the devices or vice versa, transducer means associated with each of said devices for generating signals respectively indicating the radial displacement of the object with respect to each of said devices, means connected to said transducer means for combining said signals to produce an output signal which is a function of the combined signals, said output signals being indicative of the radial displacement of the object, and means synchronized with said first mentioned means for recording said output signal.

6. A device for measuring the radial displacement of an object having a nominally circular cross section comprising: two V-angle devices adapted to respectively contact the object at circumferentially spaced points, each of said devices having a different predetermined included angle, transducer means associated with each of said devices for generating signals respectively indicating the radial displacement of the object with respect to each of said devices, means connected to said transducer means for combining said signals to produce an output signal indicative of the radial displacement of the object in accordance with the following formula:

$$R_D = K_1 \Delta i_a + K_2 \Delta i_b$$

where:

$R_D$ = radial displacement of the object to be measured
$\Delta i$ = change in measured radial deviation of the object with respect to devices $a$ and $b$
$K_1$ and $K_2$ = empirical factors to weight the values of the indicated radial displacement.

References Cited by the Examiner

UNITED STATES PATENTS

| | | | |
|---|---|---|---|
| 2,531,317 | 11/1950 | Baney | 33—174 |
| 2,723,461 | 11/1955 | Reason | 33—174 |
| 2,863,222 | 12/1958 | Comstock | 33—174 |
| 3,180,031 | 4/1965 | Roeger | 33—174 |

FOREIGN PATENTS 487,375    6/1938    Great Britain.

LEONARD FORMAN, *Primary Examiner.*

ISAAC LISANN, *Examiner.*

B. DONAHUE, *Assistant Examiner.*